United States Patent
Boardman et al.

(10) Patent No.: US 7,032,883 B2
(45) Date of Patent: Apr. 25, 2006

(54) HYBRID BUTTERFLY FLUID CONTROL VALVE

(75) Inventors: Delton M. Boardman, Acton, CA (US); Lawrence E. Parker, Castaic, CA (US)

(73) Assignee: HR Textron, Inc., Santa Clarita, CA (US)

( * ) Notice: Subject to any disclaimer, the term of this patent is extended or adjusted under 35 U.S.C. 154(b) by 0 days.

(21) Appl. No.: 10/819,397

(22) Filed: Apr. 7, 2004

(65) Prior Publication Data

US 2005/0224743 A1    Oct. 13, 2005

(51) Int. Cl.
    *F16K 1/22*    (2006.01)
(52) U.S. Cl. ............... 251/305; 251/192; 251/279
(58) Field of Classification Search ........... 251/3, 251/117, 213, 215, 279, 340, 341, 344, 345, 251/346, 157–204, 305
    See application file for complete search history.

(56) References Cited

U.S. PATENT DOCUMENTS

| | | | | |
|---|---|---|---|---|
| 4,288,060 A | | 9/1981 | Mittell | 251/215 |
| 4,921,212 A | * | 5/1990 | deQuay | 251/163 |
| 5,118,078 A | * | 6/1992 | Younker | 251/160 |
| 5,330,157 A | * | 7/1994 | Dern et al. | 251/162 |
| 5,551,666 A | * | 9/1996 | Irnich | 251/160 |
| 2002/0047101 A1 | * | 4/2002 | Buchwald | 251/89 |
| 2002/0130290 A1 | * | 9/2002 | Oberbeck | 251/175 |
| 2002/0134960 A1 | * | 9/2002 | Zwick | 251/214 |
| 2003/0101966 A1 | * | 6/2003 | Hattori et al. | 123/337 |

FOREIGN PATENT DOCUMENTS

DE    196 41 032 A1    4/1998

OTHER PUBLICATIONS

Search Report from PCT/US2005/007802 filed on Mar. 11, 2005, Total pp.: 4.

* cited by examiner

*Primary Examiner*—Justine R. Yu
*Assistant Examiner*—Andrew J. Rost
(74) *Attorney, Agent, or Firm*—BainwoodHuang; David E. Huang, Esq.

(57) ABSTRACT

A flow control valve system has a housing that defines a flow path, a throttle element disposed in the flow path, and a linkage assembly coupled to the throttle element and oriented substantially outside the flow path. With such an orientation, the linkage assembly has minimal effect on a pressure gradient or pressure drop within the flow control valve system. As such, the linkage assembly allows the flow control valve system to deliver fluid from a fluid input channel to a fluid output channel at a relatively large volume flow rate.

19 Claims, 5 Drawing Sheets

006
HYBRID BUTTERFLY FLUID CONTROL VALVE

BACKGROUND

Conventional butterfly valves, such as those used in aircraft fuel systems, control fluid flow rates within a flow channel by adjusting the position of a valve plate, or throttle plate, within the flow channel. For example, rotation of the valve plate from an open position, where a face of the valve plate orients parallel to a flow within the flow channel, to a closed position, where a face of the valve plate orients perpendicular to the flow within the flow channel, decreases the fluid flow rate within the channel.

Typically, when the butterfly valve orients the valve plate in the closed position, an outer periphery of the valve plate contacts a valve seat, such as an O-ring, within the flow channel. Such contact between the valve plate and the valve seat creates a seal that prevents fluid flow through the flow channel. However, over time, as the butterfly valve rotates the valve plate from the closed position to the open position and from the open position to the closed position, the valve plate wears against the valve seat, thereby minimizing the ability for the seal to prevent leakage through the flow channel.

To limit wear between the valve plate and the valve seat, as found in conventional butterfly valves, certain butterfly valve designs provide both rotation of the valve plate to a closed position (e.g. perpendicular to the flow within the flow channel and parallel to the valve seat) and axial translation of the valve plate against the valve seat to seal the valve plate against the seat. For example, butterfly valves configured to provide both rotational and linear positioning of the valve plate, relative to the valve seat, conventionally utilize cam assemblies. Typical cam assemblies include a cam, coupled to a shaft, and mounted within a cam chamber that attaches to a valve plate. When positioning the valve plate from an open to a closed position, for example, as the shaft rotates, the cam engages a first cam chamber surface of the cam chamber and causes the valve plate to rotate within a flow channel to a closed position (e.g., the valve plate face orients perpendicular to a fluid flow direction in the flow channel). As the shaft continues to rotate, the cam rotates within the cam chamber against a second cam chamber surface. Such rotation of the cam linearly positions the valve plate relative to a valve seat and forces the valve plate against the valve seat into a seated position, thereby sealing the flow channel.

SUMMARY

The configuration of conventional butterfly valves configured to provide both rotation of the valve plate, relative to a valve seat, and axial translation of the valve plate against the valve seat, however, suffer from a variety of deficiencies. As indicated above, certain butterfly valves conventionally utilize cam assemblies to provide both rotational and linear positioning of the valve plate relative to the valve seat. Such cam assemblies typically couple to a valve plate face of the valve plate and orient within a fluid flow path of the flow channel.

Positioning of the cam assemblies within the flow path of the flow channel generates a pressure drop through the flow channel during operation. For example, when the cam assembly positions the valve plate of the conventional butterfly valve in an open position to allow maximal fluid flow through the flow channel, the cam assemblies limit or block fluid flow through the flow channel. Such blockage, in turn, creates or increases a pressure differential (e.g., creates a pressure drop) between an input of the flow channel (e.g., prior to a fluid contacting the cam assemblies) and an output of the flow channel (e.g., after the fluid contacts the cam assemblies) and limits or reduces a flow rate of the fluid flowing from the flow channel input to the flow channel output over time. A reduction in the flow rate of the fluid through the valve reduces a total volume of fluid transmitted from the flow channel input to a flow channel output over a given period of time.

Coupling the cam assemblies to a valve plate face of the valve plate, furthermore, affects the overall performance of the butterfly valve. For example, by coupling the cam assemblies to the valve plate face, a manufacturer increases the mass of the valve plate. An increase in the mass of the valve plate increases the inertia associated with the valve plate, thereby either decreasing responsiveness of the valve plate during operation (e.g., increasing an amount of time between application of a torque to the valve plate and actuation of the valve plate) or requiring an increase in the amount of torque applied to the cam assembly to actuate the valve plate.

By contrast, embodiments of the present invention significantly overcome the described deficiencies and provide mechanisms for controlling fluid flow within a flow channel. A flow control valve system has a housing that defines a flow path, a throttle element disposed in the flow path, and a linkage assembly coupled to the throttle element and oriented substantially outside the flow path. With such an orientation, the linkage assembly has minimal effect on a pressure gradient or pressure drop within the flow control valve system. As such, the linkage assembly allows the flow control valve system to deliver fluid from a fluid input channel to a fluid output channel at a relatively large volume flow rate.

In one arrangement, a flow control valve system has a housing defining a flow path having a long axis. The housing includes a seating element disposed substantially perpendicular to the long axis of flow path and a base defining a guide path where the guide path has a linear path portion and a rotational path portion. The flow control valve system also has a throttle element having a throttle element face oriented substantially within the flow path defined by the housing. The throttle element moveably couples to the base within the guide path. The flow control valve system also has a linkage assembly coupled to the throttle element and oriented substantially outside the flow path. The linkage assembly is configured to position the throttle element along the linear path portion relative to the seating element where the throttle element face orients substantially perpendicular to the long axis of the flow path. The linkage assembly is also configured to rotate the throttle element along the rotational path portion relative to the seating element. Such linear and rotational positioning of the throttle element relative to the seating element minimizes scrubbing of the throttle element against the seating element, thereby minimizing wear of the seating element and minimizing leakage of fluid past the seating element when the throttle element contacts the seating element.

In one arrangement, the flow control valve system has a shaft coupled to the linkage assembly, the shaft having a long axis substantially aligned with an axis of rotation of the linkage assembly. The throttle element of the flow control valve system has a guide bracket in positional communication with the shaft. When the linkage assembly positions the throttle element within the flow path, the guide bracket, in conjunction with the shaft, aids in constraining motion of the throttle element within the flow path to minimize vibration or "flutter" of the throttle element during positioning. By minimizing "flutter" of the throttle element, the guide bracket limits the throttle element from creating turbulence within the flow control valve system and, in turn, increasing a pressure drop within the flow control valve system as the throttle element orients to an open position.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention provide mechanisms for controlling fluid flow within a flow channel. A flow control valve system has a housing that defines a flow path, a throttle element disposed in the flow path, and a linkage assembly coupled to the throttle element and oriented substantially outside the flow path. With such an orientation, the linkage assembly has minimal effect on a pressure gradient or pressure drop within the flow control valve system. As such, the linkage assembly allows the flow control valve system to deliver fluid from a fluid input channel to a fluid output channel at a relatively large volume flow rate.

Figure 1:
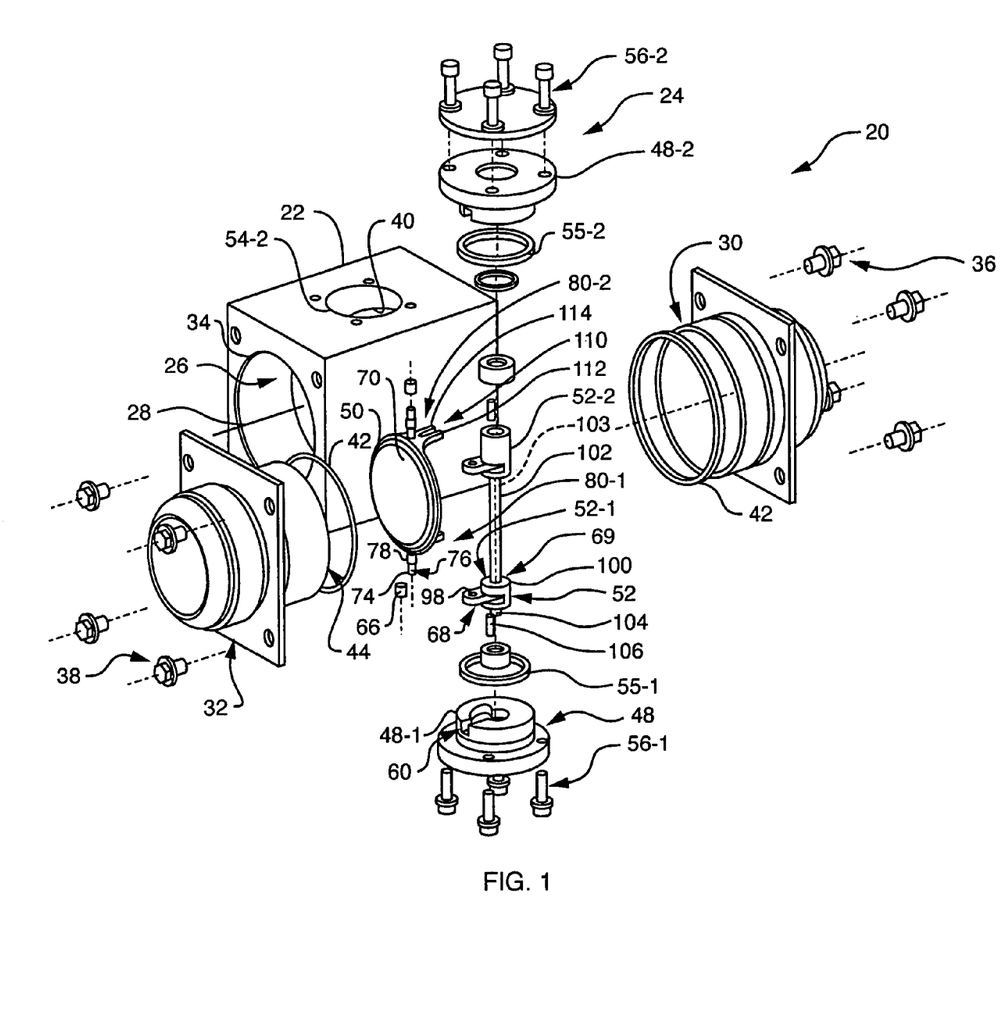
FIG. 1 is an exploded view of a flow control valve system, according to one embodiment of the invention.
Figure 2:
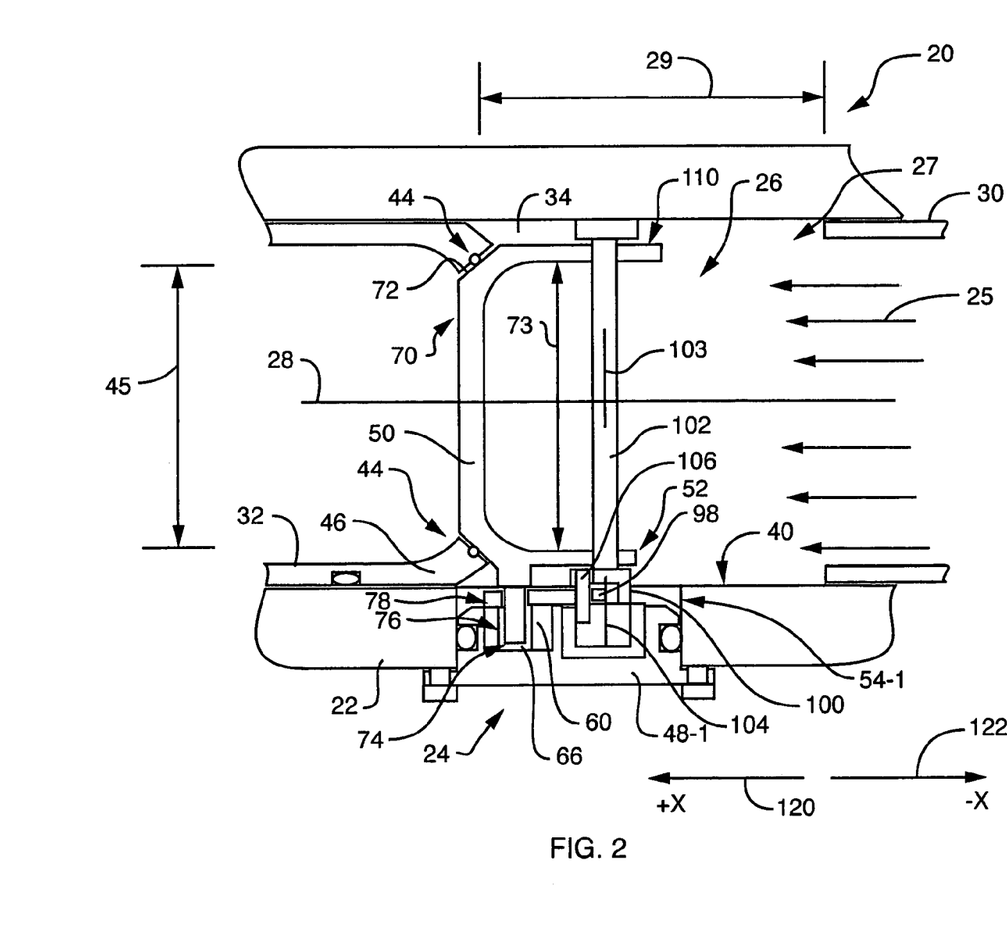
FIG. 2 is a sectional view of the flow control valve system of FIG. 1, according to one embodiment of the invention.

FIGS. 1 and 2 illustrate an example of a flow control valve system 20 having a housing 22 and a flow control valve assembly 24.

The housing 22 of the flow control valve system 20 has a fluid input channel 30 and a fluid output channel 32 where the fluid input channel 30 attaches to a fluid source (e.g., a fuel supply tank) and the fluid output channel 32 attaches to a fluid destination (e.g., an aircraft fuel tank). In one arrangement, the fluid input channel 30 inserts within a bore 34 defined by the housing 22 and attaches to the housing 22 via fasteners 36. The fluid input channel 30 has a sealing ring (e.g., an O-ring) 42 oriented between the channel 30 and an inner surface 40 of the housing 22 (e.g., the surface 40 defining the bore 34) to minimize fluid leakage outside of the housing 22. Additionally, the fluid output channel 32 (e.g., opposing the fluid input channel 30) inserts within the bore 34 and couples to the housing 22 with fasteners 38. The fluid output channel 32 has a sealing ring (e.g., an O-ring) 42 oriented between the channel 32 and the inner surface 40 of the housing 22.

The bore 34 within the housing 22 defines a flow path 26 along a long axis 28 of the housing 22. In particular, the housing 22 delimits a cross-sectional shape (e.g., a substantially circular cross-section) along a length 29 of the housing 22 (e.g., from the fluid input channel 30 to the fluid output channel 32) to define a volume. The volume within the housing 22 forms the flow path 26 that carries a fluid stream 27, such as a fuel stream, from the fluid input channel 30 to the fluid output channel 32.

The housing 22 has a seating element 44 defining a plane oriented substantially perpendicular to the long axis 28 of the flow path 26. For example, in one arrangement, as indicated in FIG. 2, the seating element 44 is formed as a sealing ring or O-ring coupled to a perimeter 46 of the fluid output channel 32. The seating element 44, in conjunction with the flow control valve assembly 24, minimizes or prevents leakage of the fluid 25 into the fluid output channel 32 when the flow control valve assembly 24 orients in a closed position.

The flow control valve assembly 24 includes a throttle element 50, a valve assembly base 48 defining a guide path 60, and a linkage assembly 52. The flow control valve assembly 24 is configured to minimize leakage of fluid 25 through the flow control valve system 20 when the assembly 24 orients in a closed position. The flow control valve assembly 24 is also configured to meter fluid flow through the flow control valve system 20 and adjust a flow rate of the fluid 25 flowing through the system 20.

The throttle element 50, such as a poppet, positions within the flow path 26 of the housing 22. The throttle element 50 has, for example, a substantially flat throttle element face 70 and has a throttle element perimeter 72 defining a diameter 73 substantially equal to a diameter 45 of the sealing element 44. The throttle element 50 orients substantially within the flow path 26 defined by the housing 22, as shown by FIG. 2. Because the throttle element 50 (e.g., the throttle element face 70) orients substantially within the flow path 26, the throttle element 50 controls the flow of fluid 25 within the flow control valve system 20. For example, FIG. 2 illustrates the throttle element 50 in a closed position (e.g., the throttle element perimeter 72 contacts the sealing element 44) that minimizes the flow of fluid 25 from the fluid inlet 30 to the fluid outlet 32.

The throttle element 50 couples in moveable communication within the guide path 60 defined by the valve assembly base 48. For example, in one arrangement, the throttle element 50 has a throttle pin 74 positioned within the guide path 60. The throttle pin 74 has first end 76 that inserts within the guide path 60. As the throttle element 50 positions within the flow channel 26 (e.g., as positioned by the linkage assembly 52, described below) the throttle pin 74 slides within the guide path 60. Communication between the throttle pin 74 and the guide path 60 directs the throttle element 50 (e.g., a face 70 of the throttle element) to particular orientations within the flow path 26, as described below.

The valve assembly base 48, in one arrangement, includes a first base 48-1 and a second base 48-2. During assembly, the first base 48-1 inserts within a first opening 54-1 defined by the housing 22 and substantially perpendicular to the flow path 26. The first base 48-1 includes a sealing ring 55-1 oriented between the housing 22 and the first base 48-1 to minimize leakage of fluid 25 past the housing 22 and couples to the housing 22 with fasteners 56-1. Also during assembly, the second base 48-2 inserts within a second opening 54-2 (e.g., opposing the first opening 54-1) defined by the housing 22. The second base 48-2 includes a sealing ring 55-2 oriented between the housing 22 and the second base 48-2 to minimize leakage of fluid 25 past the housing 22 and couples to the housing 22 with fasteners 56-2. The valve base assembly 48 aids in securing the throttle element 50 within the housing 22.

The guide path 60 defined by the valve assembly base 48 is configured to direct or control an orientation of the throttle element 50 within the flow control valve system 20 during operation.

Figure 3:
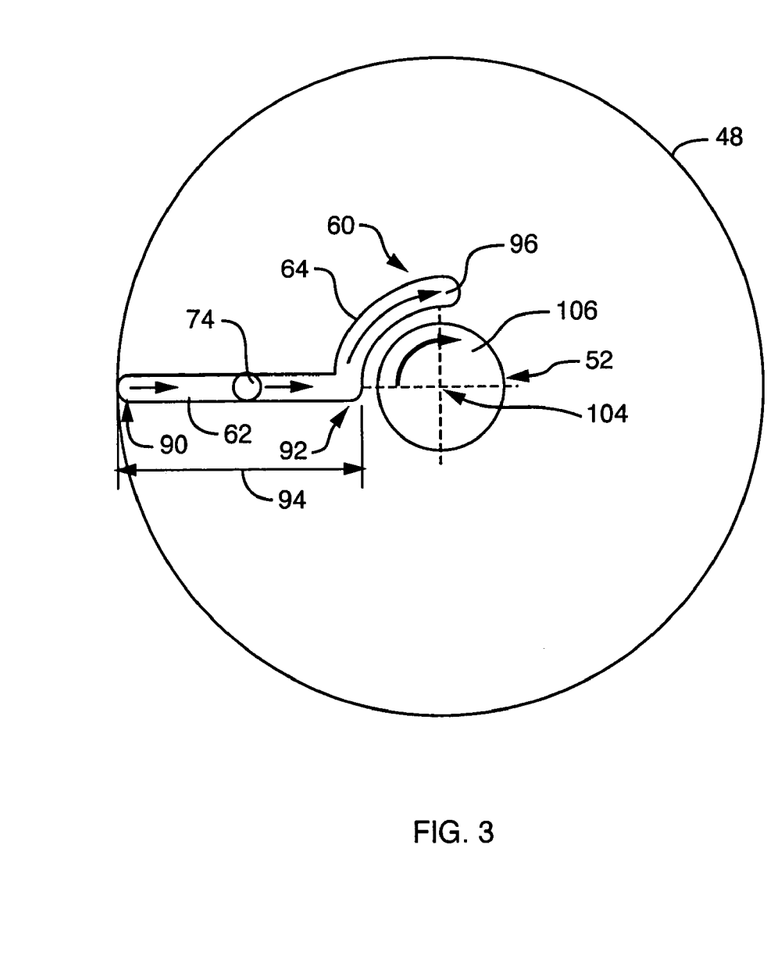
FIG. 3 illustrates a guide path associated with the flow control valve system of FIG. 1, according to one embodiment of the invention.

FIG. 3 illustrates, for example, a top view of an arrangement of the guide path 60 defined by the valve assembly base 48 (see also FIG. 1). The guide path 60 has a linear path portion 62 and a rotational path portion 64. The linear path portion 62 orients substantially parallel to the long axis 28 of the housing 22 and substantially perpendicular to the seating element 44 (e.g., perpendicular to a plane defined by the seating element 44). The linear path portion 62 is configured to guide the throttle element 50 in a linear path relative to the seating element 44 and relative to the long axis 28 of the housing 22 such that the face 70 of the throttle element 50 remains substantially parallel to the plane defined by the sealing element 44 and substantially perpendicular to the long axis 28 of the housing 22. Such linear positioning of the throttle element 50 relative to the seating element 44 minimizes rotational "scrubbing" of the throttle element 50 against the seating element 44, thereby minimizing wear of the seating element 44. The rotational path portion 62 forms an arc of approximately 90° relative to the long axis 28 of the housing 22. The rotational path portion 62 is configured to rotate the throttle element 50 within the flow path 26 to adjust a flow rate of the fluid 25 flowing to the fluid output channel 32.

The linkage assembly 52, in one arrangement, includes a first linkage assembly 52-1 and a second linkage assembly 52-2. The first linkage assembly 52-1 attaches to a first end 80-1 (e.g., a top end) of the throttle element 50 and the second linkage assembly 52-2 attaches to a second end 80-2 (e.g., a bottom end) of the throttle element 50. The linkage assemblies 52-1, 52-2 also position within the corresponding valve assembly bases 48-1, 48-2, respectively, and are connected by the shaft 100.

The use of the linkage assemblies 52-1, 52-2 in conjunction with the base assemblies 48-1, 48-2 aids in securing opposing ends 80-1, 80-2 (e.g., throttle pins 74 located on opposing ends 80-1, 80-2) of the throttle element 50 to the housing 22 within the flow control valve system 20. By securing both ends 80-1, 80-2 of the throttle element 50 to the housing 22, the linkage assemblies 52-1, 52-2 and base assemblies 48-1, 48-2 minimize vibration or "flutter" of the throttle element 50 as the linkage assemblies 52-1, 52-2 position the throttle element 50 within the flow path 26. By minimizing "flutter" of the throttle element 50, the linkage assemblies 52-1, 52-2 and base assemblies 48-1, 48-2 limit the throttle element 50 from creating of turbulent flow within the flow control valve system 20 during operation. The linkage assemblies 52-1, 52-2 and base assemblies 48-1, 48-2 allow the throttle element 50 to provide a relatively accurate control of fluid flow within the flow control valve system 20.

The linkage assembly 52 couples to the throttle element 50 and is configured to position the throttle element 50 within the flow path 26. For example, in one arrangement, a first end 68 of the linkage assembly 52 couples to a second end 78 of the throttle pin 74 (e.g., of the throttle element 50) and a second end 69 of the linkage assembly 52 attaches to a motor, for example. During operation, rotation of a motor shaft of the motor actuates the linkage assembly 52. Actuation of the linkage assembly 52, in turn, positions the throttle pin 74 along the guide path 60. The location of the throttle pin 74 within the guide path 60 determines the orientation of the throttle element 50 within the flow path 26.

For example, assume the flow control valve system 20 positions the throttle element 50 from a fully closed position (e.g., the face 70 of the throttle element 50 orients perpendicular to the flow stream 27 and the perimeter 72 of the throttle element 70 contacts the seating element 44) to a fully opened position (e.g., the face 70 of the throttle element 50 orients substantially perpendicular to the flow stream 27). Further assume rotation of a motor shaft actuates the linkage assembly 52. During operation, and referring to FIG. 3, the linkage assembly 52 positions the throttle pin 74 along the linear path portion 62 from a first pin position 90 to a second pin position 92 to move the throttle element 50 away from the sealing element 44.

Figure 4:
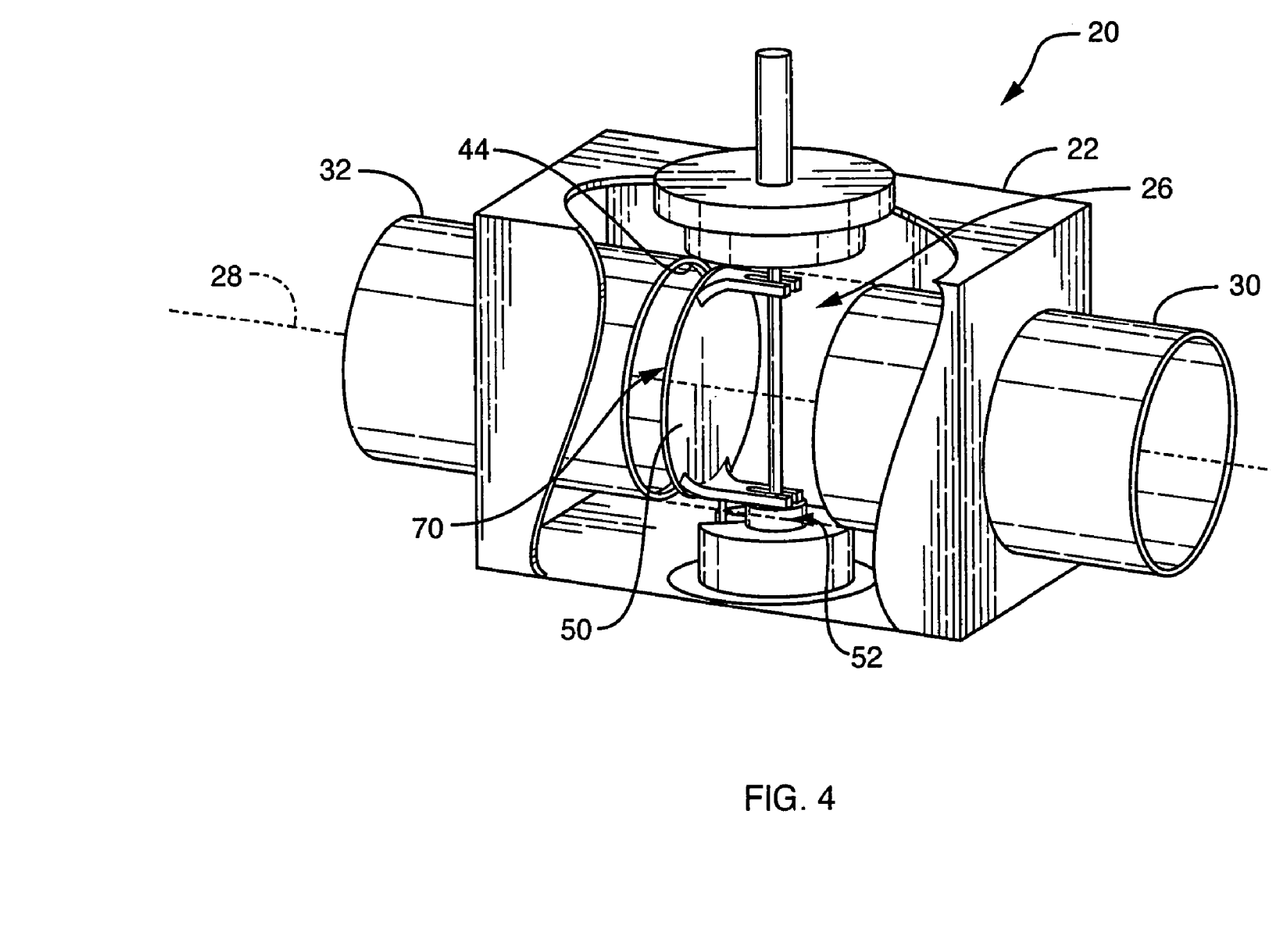
FIG. 4 illustrates a cutaway view of the flow control valve system with a valve plate of the valve system oriented in a first position within a fluid flow channel, according to one embodiment of the invention.

As illustrated in FIG. 4 (see also FIG. 1), during such positioning, the linear path portion 62 maintains the throttle element face 70 substantially perpendicular to the long axis 28 of the housing 22 and substantially parallel to a plane defined by the seating element 44 (e.g., the linear path portion 62 constrains the motion of the throttle element 50). In such a configuration, the throttle element 50 meters a flow of fluid 25 through the flow path 26 to the fluid output channel 32 (e.g., meters flow within the flow control valve system 20). For example, when the throttle element 50 meters fluid flow, the throttle element 50 provides a linear increase in an effective flow area within the housing 22 (e.g., a cross sectional area of the flow path 26 available for fluid flow). As the throttle element 50 moves away from the valve seat 44, the throttle element 50 provides a relatively linear flow increase (e.g., a linear increase in flow volume) through the housing 22.

Additionally, by maintaining the throttle element face 70 substantially parallel to a plane defined by the seating element 44 as the throttle element 50 moves away from the seating element 44, the linkage assembly 52 and the linear path portion 62 of the guide path 60 minimizes rotational "scrubbing" of the throttle element 50 against the seating element 44, thereby minimizing wear of the seating element 44. With minimal wear over time, the throttle element 50 and the seating element 44 maintain a fluid seal between the fluid input channel 30 and the fluid output channel 32 when the throttle element 50 orients in a closed position (e.g., as shown in FIG. 2), thereby minimizing leakage into the fluid output channel 32.

During further operation of the flow control valve system 20, as the motor continues to actuate the linkage assembly 52, the linkage assembly 52 positions the throttle pin 74 along the rotational path portion 64 of the guide path 60 from the second pin position 92 to a third pin position 96. The rotational path portion 64 causes the throttle element 50 to rotate within the flow path 26 such that the face 70 of the throttle element 50 positions from a substantially perpendicular orientation relative to the flow stream 27 (e.g., a metering position) to a substantially parallel orientation relative to the flow stream 27 (e.g., a fully opened position).

Figure 5:
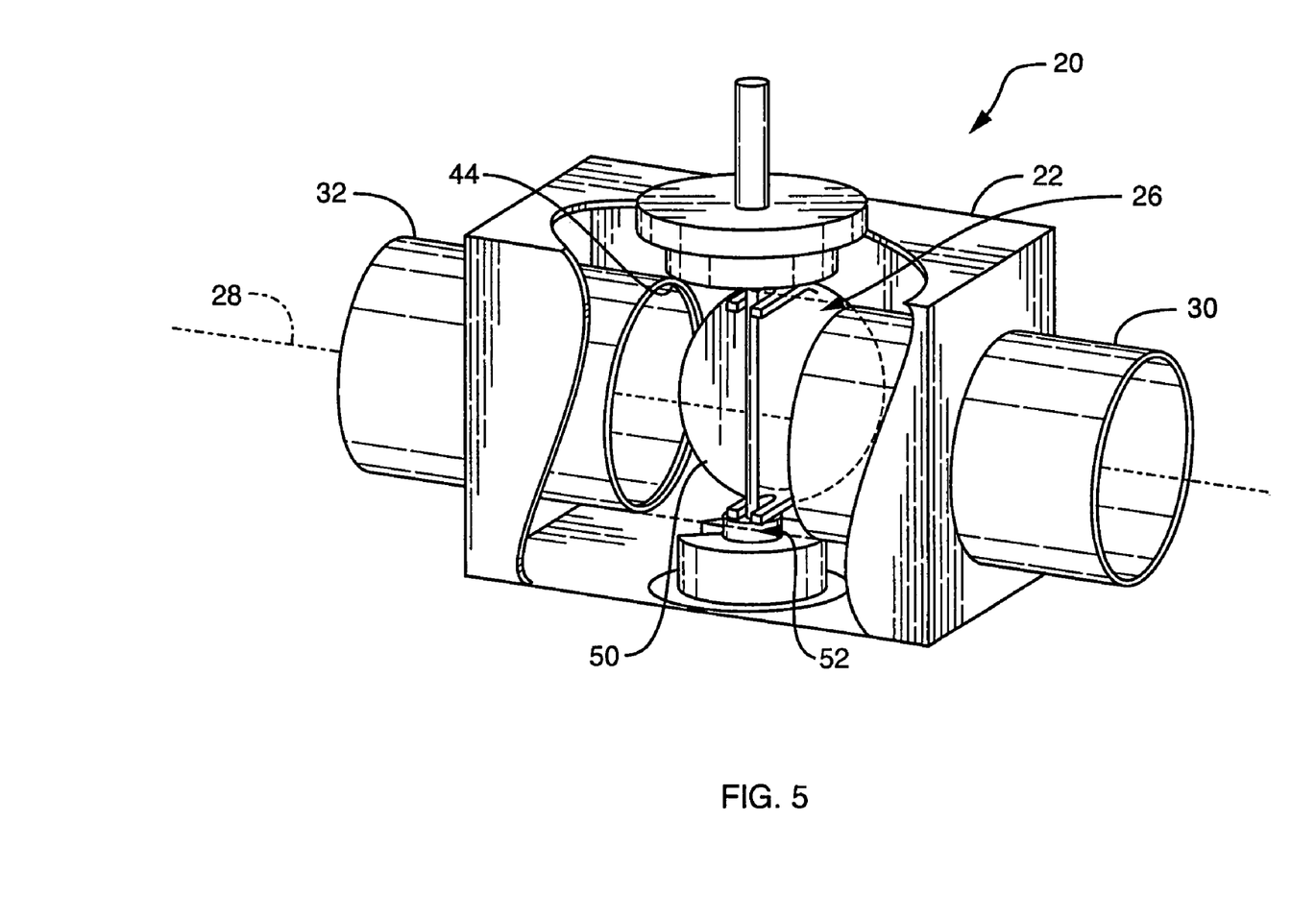
FIG. 5 illustrates a cutaway view of the flow control valve system of FIG. 3 with a valve plate of the valve system oriented in a second position within the fluid flow channel, according to one embodiment of the invention.

As indicated in FIG. 5, the linkage assembly 52 and rotational path portion 64 position the throttle element 50 along an arc of approximately 90° relative to the long axis 28 of the housing 22 and relative to the seating element 44 (see also FIG. 1). During rotation of the throttle element 50, the linkage assembly 52 and the rotational path portion 64 maintain a distance between the seating element 44 and the throttle element 50 (e.g., a distance formed between the throttle element 50 and the seating element 44 when the throttle element 50 positioned within the second pin position 92) to limit contact of the throttle element 50 against the sealing element 44. By maintaining the distance between the seating element 44 and the throttle element 50, the linkage assembly 52 and rotational path portion 64 minimizes "scrubbing" of the throttle element 50 against the seating element 44.

Also, as the linkage assembly 52 and rotational path portion 64 rotate the throttle element 50 within the flow path 60, such positioning reduces a profile area of the throttle element 50 (e.g., a cross-sectional area of the throttle element 50 blocking the flow path 26 decreases). As the throttle element pin 74 positions from the second pin position 92 to the third pin position 96, the throttle element 50 reduces (e.g., adjusts) a pressure drop through the flow control valve system 20 while maintaining the flow rate through the flow path 26. By reducing a pressure drop between the fluid input channel 30 and the fluid output channel 32, the throttle element 50 allows a user to efficiently provide fluid, such as aircraft fuel, to a fluid destination, such as a fuel tank associated with an aircraft.

As illustrated in FIG. 2, for example, the linkage assembly 52 is disposed within the housing 22 substantially outside the flow path 26 defined by the housing 22. In one arrangement, such orientation minimizes contact between the linkage assembly and the fluid stream 27 flowing through the flow path 26. For example, during operation, (e.g., when the throttle element 50 orients in an "open" position), fluid 25 flows through the flow path 26 from the fluid input channel 30 to the fluid output channel 32. As illustrated by FIG. 2, the valve assembly base 48 houses the linkage assembly 52 and positions the linkage assembly 52 (e.g., at least a portion of the linkage assembly 52) substantially outside of the fluid stream 27 carried by the flow path 26 (e.g., substantially outside of the flow path 26). With such positioning, the linkage assembly 52 provides a minimal disruption or blockage to the flow of the fluid 25, within the flow path 26, from the fluid input channel 30 to the fluid output channel 32. Orientation of the linkage assembly 52 substantially outside of the flow path 26, therefore, minimizes the creation of a pressure drop within the flow control valve system 20 and allows the flow control valve system 20 to deliver fluid 25 from the fluid input channel 30 to the fluid output channel 32 at a relatively large volume flow rate.

Returning to FIG. 3, in one arrangement, the linear path portion 62 of the guide path 60 defines a length 94 of approximately one-quarter of the diameter 45 of the seating element 44. As illustrated, the length 94 runs from the first pin position 90 to the second pin position 92. When the linkage assembly 52 orients the throttle pin 74 in the second pin position 92, the throttle element face 70 of the throttle element 50 positions, relative to the seating element 44 at a corresponding distance of approximately one-quarter of the diameter 45 of the seating element 44. In such a position, the valve assembly 24 is approximately 25% open and the throttle element 50 allows full flow (e.g., a maximum flow rate) of fluid 25 from the fluid input channel 30 to the fluid output channel 32. Additionally, when the throttle element 50 orients in such a position, the throttle element 50 maintains a pressure drop between the fluid input channel 30 and the fluid output channel 32. By maintaining a pressure drop between the fluid input channel 30 and the fluid output channel 32, the throttle element 50 allows a user to siphon fluid, such as aircraft fuel, from a fluid storage location, such as a fuel tank associated with an aircraft.

FIGS. 1 and 2 also illustrate an arrangement of the linkage assembly 52. The linkage assembly 52 has a linkage element 98 having a first end 68 and a second end 69, a crank element 100 defining an axis of rotation 104, and a crank pin or journal pin 106 offset from the axis of rotation 104. The first end 68 of the linkage element 98 couples to the second end 78 of the throttle pin 74 and the second end 69 of the linkage element 98 couples to the crank pin 106. In one arrangement, the crank element 100 is integrally formed with a shaft or crankshaft 102 such that the axis of rotation 104 of the crank element 100 substantially aligns with a long axis 103 of the shaft 102. The shaft 102 is configured to attach to a motor to actuate the linkage assembly 52.

Such a configuration of the linkage assembly 52 has relatively few elements or pieces (e.g., as compared to conventional valve assemblies). Inclusion of fewer elements in the linkage assembly 52 reduces a mass associated with or attached to the throttle element 50. Minimization of the mass of the throttle element 50 increases a response capability of the throttle element 50 during positioning, thereby allowing the throttle element 50 to provide a relatively accurate control of fluid flow within the flow control valve system 20. Additionally, the configuration of linkage assembly 52 provides relatively precise positioning of the throttle element 50 at any location along the guide path 60. The linkage assembly 52, therefore, additionally enables the throttle element 52 to provide a relatively accurate control of fluid flow within the flow control valve system 20.

During operation, when the linkage assembly 52 positions the throttle element 50 from the open position, as shown in FIG. 5, to a "metering" position, as shown in FIG. 4, and then to the closed position, as shown in FIG. 2, the shaft 102 rotates the crank element 100 within the base 48 about the axis of rotation 104. Such rotation positions the crank pin 106 and the linkage element 98 about the axis of rotation 104. The linkage element 98, in turn, forces the throttle pin 74 within the rotational guide path 64 from the third pin position 96 to the second pin position 92 such that the face 70 of the throttle element 50 is substantially perpendicular to the long axis 28 of the housing 22. As the shaft 102 continues to rotate the crank element 100, the crank element 100 rotates the crank pin 106 about the axis of rotation 104, thereby extending the first end 68 of the linkage element 98 away from the shaft 102 and forcing the throttle pin 74 within the linear path portion 62 from the second pin position 92 to the first pin position 90. When the linkage element 98 positions the throttle pin 74 in the first pin position 90, the linkage assembly 52 toggles the throttle element 50 (e.g., the perimeter 72 of the throttle element 50) against the sealing element 44 and generates a relatively large seating force between the throttle element 50 and the sealing element 44. The relatively large seating force minimizes leakage of fluid 25 within the flow channel 26 through the fluid output channel 32.

FIGS. 1 and 2 illustrate an arrangement of the throttle element 50 where the throttle element 50 has a guide bracket 110 in positional communication with the shaft 102. The guide bracket 110 has a first bracket element 112 and a second bracket element 114 integrally formed with the throttle element 50 at an end 80 of the throttle element 50, for example. When the linkage assembly 52 positions the throttle element 50 along the linear path portion 62, the guide bracket 110 slides relative to the shaft 102 while maintaining contact with the shaft 102. As such, the guide bracket 110 helps to maintain orientation of the throttle element face 70 of the throttle element 50 substantially perpendicular to the long axis 28 of the housing and substantially perpendicular to the seating element 44 during linear positioning of the throttle element 50. When the linkage assembly 52 positions the throttle element 50 along the rotational path portion 64, the guide bracket 110 pivots relative to the shaft 102 while maintaining contact with the shaft 102.

The guide bracket 110 aids in constraining motion of the throttle element 50 during linear or rotational positioning of the throttle element 50. The guide bracket 110, therefore, minimizes vibration or "flutter" of the throttle element 50 when the linkage assembly 52 positions the throttle element 50 within the flow path 26. By minimizing "flutter" of the throttle element 50, the guide bracket 110 limits the throttle element 50 from creating turbulence within the flow control valve system 20 during operation. As such, when the throttle element 50 orients in an open position (e.g., along the rotational path portion 64) the throttle element 50 minimally affects the pressure drop within the flow control valve system 20 and provides relatively accurate control of fluid flow (e.g., control of a fluid flow rate) within the flow control valve system 20.

While this invention has been particularly shown and described with references to preferred embodiments thereof, it will be understood by those skilled in the art that various changes in form and details may be made therein without departing from the spirit and scope of the invention as defined by the appended claims.

For example, in one arrangement, the throttle pin 74 has a bushing 66 disposed between the throttle pin 74 and the guide path 60. The bushing 66, in one arrangement, secures the throttle element 50 to the guide path 60, thereby minimizing the presence of "gaps" between the guide path 60 and the throttle pin 74. By maintaining contact between the throttle pin 74 and the guide path 60, the bushing 66 limits vibration of the throttle element 50 when the throttle element 50 positions within the flow path 26. Minimal vibration of the throttle element 50 limits a creation of turbulent flow within the flow control valve system 20 during operation and allows the throttle element 50 to provide a relatively accurate control of fluid flow (e.g., control of fluid flow rate) within the flow control valve system 20.

FIGS. 1 and 2 illustrate an arrangement of the flow control valve system 20 where the valve assembly base 48 defines the guide path 60 couples to the housing via fasteners 56. Such an illustration is by way of example only. In another arrangement, the housing 22 has a base integrally formed with the housing 22 and defining the guide path 60. The linkage assembly 52 and throttle element 50 insert within the bore 34 of the housing 22 and couple to the guide path 60 defined by the base of the housing. Such an arrangement reduces the number of components associated with the flow control valve system 20.

As indicated above, the throttle element 50 has a throttle pin 74. The first end of the throttle pin 74 orients within the guide path 60 defined by the base 48 and a second end 78 of the throttle pin 74 couples to the linkage assembly 52. The throttle pin 74, therefore serves a dual purpose with in the system 20. The throttle pin 74 allows positioning of the throttle element 50 within the flow path 26 during operation and aids in guiding the throttle element 50 to particular orientations within the flow path 26 during operation. Because the throttle pin 74 is configured as a single element serving a dual purpose, the throttle pin 74 minimizes the number of components forming flow control valve system 20. Additionally, because the throttle pin 74 is configured as a single element, as opposed to being configured as multiple elements, the throttle pin 74 does not substantially increase the mass of the throttle element 50. The configuration of the throttle pin 74, therefore, allows the throttle element 50 to respond relatively quickly to a positional force provided by the linkage assembly 52 thereby allowing the throttle element 50 to provide a relatively accurate control of fluid flow within the flow control valve system 20.

FIG. 2 illustrates a configuration of the linkage assembly 52 and the valve assembly base 48. As indicated above, in one arrangement, the linkage assembly 52 has a linkage element 98 having a first end 68 coupled to the throttle pin 74 of the throttle element 50 and a second end 69 coupled to a crank element 100 via a crank pin 106. As illustrated, the linkage element 98, the throttle pin 74, and the crank pin 106 orient substantially within the base 54-1. The crank element 100, the throttle element 50 and the shaft 102 constrain the linkage element 98, the throttle pin 74, and the crank pin 106 within the base 54-1. For example, assume the case where the linkage element 98, the throttle pin 74, and the crank pin 106 become detached from one another. Because the crank element 100, the throttle element 50 and the shaft 102 constrain the elements 98, 74, 106 within the base 54-1, such constraint minimizes the ability for the detached elements 98, 74, 106 to enter the fluid channel output 32, travel to a component located downstream of the fluid channel output 32, such as an aircraft engine, and damage the component.

FIG. 2 illustrates the flow stream 27 flowing through the flow control valve system 20 along a +X-direction 120. As indicated above, the flow control valve system 20 is described as being configured to meter flow along the +X-direction 120. In another arrangement, the flow control valve system 20 is configured to meter flow along the −X-direction 122 (e.g., a direction opposing the +X-direction 120).

Such variations are intended to be covered by the scope of embodiments of the invention. As such, the foregoing description of embodiments of the invention is not intended to be limiting. Rather, any limitations to the invention are presented in the following claims.

What is claimed is:

1. A flow control valve system comprising:
a housing defining a flow path having a long axis, the housing having a seating element disposed substantially perpendicular to the long axis of flow path and the housing having a base defining a guide path, the guide path having a linear path portion and a rotational path portion;
a throttle element having a throttle element face oriented substantially within the flow path defined by the housing, the throttle element moveably coupled to the base within the guide path; and
a linkage assembly coupled to the throttle element and oriented substantially outside the flow path, the linkage assembly configured to (i) position the throttle element along the linear path portion relative to the seating element, the throttle element face oriented substantially perpendicular to the long axis of the flow path and (ii) rotate the throttle element along the rotational path portion relative to the seating element;
wherein the linkage assembly positions the throttle element along the linear path portion of the guide path, relative to the seating element, to meter flow within the flow control valve system; and
wherein the linear path portion of the guide path defines a length of approximately one-quarter of a diameter of the seating element.

2. The flow control valve system of claim 1 wherein the throttle element comprises a throttle pin having a first end and a second end, the first end of the throttle pin moveably coupled to the base within the guide path defined by the housing and the second end of the throttle pin coupled to the linkage assembly.

3. The flow control valve system of claim 2 wherein the linkage assembly comprises a linkage element having a first end and a second end and a crank element defining an axis of rotation and a crank pin offset from the axis of rotation, the first end of the linkage element coupled to the second end of the throttle pin and the second end of the linkage element coupled to the crank pin.

4. The flow control valve system of claim 1 wherein:
the linkage assembly comprises a shaft having a long axis substantially aligned with an axis of rotation of the linkage assembly; and
the throttle element comprises a guide bracket in positional communication with the shaft.

5. The flow control valve system of claim 1 wherein the throttle element is configured to adjust a pressure drop of a fluid flow during rotation of the throttle element relative to the seating element.

6. A flow control valve assembly comprising:
a valve assembly base defining a guide path having a linear path portion and a rotational path portion, the valve assembly base configured to couple to a housing defining a flow path having a long axis;
a throttle element moveably coupled, within the guide path, to the valve assembly base, the throttle element having a throttle element face configured to oriented substantially within the flow path defined by the housing; and
a linkage assembly coupled to the throttle element and configured to orient substantially outside the flow path defined by the housing, the linkage assembly configured to (i) position the throttle element along the linear path portion, the throttle element face oriented substantially perpendicular to the long axis of the flow path and (ii) rotate the throttle element, along the rotational path portion relative to the long axis of the flow path;
wherein the linkage assembly is configured to position the throttle element along the linear path portion of the guide path to meter a fluid flow; and
wherein the linear path portion of the guide path defines a length of approximately one-quarter of a diameter of the seating element.

7. The flow control valve assembly of claim 6 wherein the throttle element comprises a throttle pin having a first end and a second end, a first end of the throttle pin moveably coupled to the valve assembly base within the guide path defined by the valve assembly base and the second end of the throttle pin coupled to the linkage assembly.

8. The flow control valve assembly of claim 7 wherein the linkage assembly comprises a linkage element having a first end and a second end and a crank element defining an axis of rotation and a crank pin offset from the axis of rotation, the first end of the linkage element coupled to the second end of the throttle pin and the second end of the linkage element coupled to the crank pin.

9. The flow control valve assembly of claim 6 wherein:
the linkage assembly comprises a shaft having a long axis substantially aligned with an axis of rotation of the linkage assembly; and
the throttle element comprises a guide bracket in positional communication with the shaft.

10. The flow control valve assembly of claim 6 wherein the linkage assembly is configured to position the throttle element along the rotational path portion of the guide path to adjust a pressure drop of a fluid flow.

11. A method for manufacturing a flow control valve system comprising:
forming a housing defining a flow path having a long axis, the housing having a seating element disposed substantially perpendicular to the long axis of flow path;
forming a guide path within a base of the housing, the guide path having a linear path portion and a rotational path portion;
coupling a throttle element to the housing, the throttle element having a throttle element face oriented substantially within the flow path defined by the housing, the throttle element moveably coupled to the base within the guide path; and
coupling a linkage assembly to the throttle element; and
orienting the linkage assembly substantially outside the flow path, the linkage assembly configured to (i) position the throttle element along the linear path portion relative to the seating element, the throttle element face oriented substantially perpendicular to the long axis of the flow path and (ii) rotate the throttle element, along the rotational path portion relative to the seating element;
wherein the linkage assembly positions the throttle element along the linear path portion of the guide path, relative to the seating element, to meter flow within the flow control valve system; and
wherein the linear path portion of the guide path defines a length of approximately one-quarter of a diameter of the seating element.

12. The method of claim 11 further comprising:
coupling a shaft having a long axis to the linkage assembly, the long axis of the shaft substantially aligned with an axis of rotation of the linkage assembly; and
placing a guide bracket of the throttle element in positional communication with the shaft.

13. The method of claim 11 wherein the throttle element comprises a throttle pin having a first end and a second end, the first end of the throttle pin moveably coupled to the base within the guide path defined by the housing and the second end of the throttle pin coupled to the linkage assembly; and
wherein the linkage assembly comprises a linkage element having a first end and a second end and a crank element defining an axis of rotation and a crank pin offset from the axis of rotation, the first end of the linkage element coupled to the second end of the throttle pin and the second end of the linkage element coupled to the crank pin.

14. A flow control valve system comprising:
a housing defining a flow path having a long axis, the housing having a seating element disposed substantially perpendicular to the long axis of flow path and the housing having a base defining a guide path, the guide path having a linear path portion and a rotational path portion;
a throttle element having a throttle element face and having a throttle pin, a first end of the throttle pin moveably coupled to the base within the guide path; and
a linkage assembly coupled to a second end of the throttle pin, the linkage assembly configured to (i) position the throttle element along the linear path portion relative to the seating element, the throttle element face oriented substantially perpendicular to the long axis of the flow path and (ii) rotate the throttle element along the rotational path portion relative to the seating element;

wherein the linkage assembly positions the throttle element along the linear path portion of the guide path, relative to the seating element, to meter flow within the flow control valve system; and wherein the linear path portion of the guide path defines a length of approximately one-quarter of a diameter of the seating element.

15. The flow control valve system of claim 14 wherein the throttle element face of the throttle element orients substantially within the flow path of the housing and the linkage assembly orients substantially outside of the flow path defined by the housing.

16. The flow control valve system of claim 14 wherein:
the linkage assembly comprises a shaft having a long axis substantially aligned with an axis of rotation of the linkage assembly; and
the throttle element comprises a guide bracket in positional communication with the shaft, the guide bracket configured to maintain orientation of the throttle element face of the throttle element substantially perpendicular to the long axis of the flow path during linear positioning of the throttle element.

17. The flow control valve system of claim 14 wherein the linkage assembly comprises a linkage element having a first end and a second end and a crank element defining an axis of rotation and a crank pin offset from the axis of rotation, the first end of the linkage element coupled to the second end of the throttle pin and the second end of the linkage element coupled to the crank pin.

18. A flow control valve system comprising:
a housing defining a flow path having a long axis, the housing having a seating element disposed substantially perpendicular to the long axis of flow path and the housing having a base defining a guide path, the guide path having a linear path portion and a rotational path portion;
a throttle element having a throttle element face oriented substantially within the flow path defined by the housing, the throttle element moveably coupled to the base within the guide path; and
a linkage assembly coupled to the throttle element and oriented substantially outside the flow path, the linkage assembly configured to (i) position the throttle element along the linear path portion relative to the seating element, the throttle element face oriented substantially perpendicular to the long axis of the flow path and (ii) rotate the throttle element along the rotational path portion relative to the seating element;

wherein the throttle element comprises a throttle pin having a first end and a second end, the first end of the throttle pin moveably coupled to the base within the guide path defined by the housing and the second end of the throttle pin coupled to the linkage assembly; and wherein the linkage assembly comprises a linkage element having a first end and a second end and a crank element defining an axis of rotation and a crank pin offset from the axis of rotation, the first end of the linkage element coupled to the second end of the throttle pin and the second end of the linkage element coupled to the crank pin.

19. A flow control valve assembly comprising:
a valve assembly base defining a guide path having a linear path portion and a rotational path portion, the valve assembly base configured to couple to a housing defining a flow path having a long axis;
a throttle element moveably coupled, within the guide path, to the valve assembly base, the throttle element having a throttle element face configured to oriented substantially within the flow path defined by the housing; and
a linkage assembly coupled to the throttle element and configured to orient substantially outside the flow path defined by the housing, the linkage assembly configured to (i) position the throttle element along the linear path portion, the throttle element face oriented substantially perpendicular to the long axis of the flow path and (ii) rotate the throttle element, along the rotational path portion relative to the long axis of the flow path;

wherein the throttle element comprises a throttle pin having a first end and a second end, a first end of the throttle pin moveably coupled to the valve assembly base within the guide path defined by the valve assembly base and the second end of the throttle pin coupled to the linkage assembly; and wherein the linkage assembly comprises a linkage element having a first end and a second end and a crank element defining an axis of rotation and a crank pin offset from the axis of rotation, the first end of the linkage element coupled to the second end of the throttle pin and the second end of the linkage element coupled to the crank pin.

* * * * *